Oct. 25, 1938.　　　　　F. J. HINES　　　　　2,134,402
ELECTRIC FIXTURE
Original Filed Sept. 3, 1931
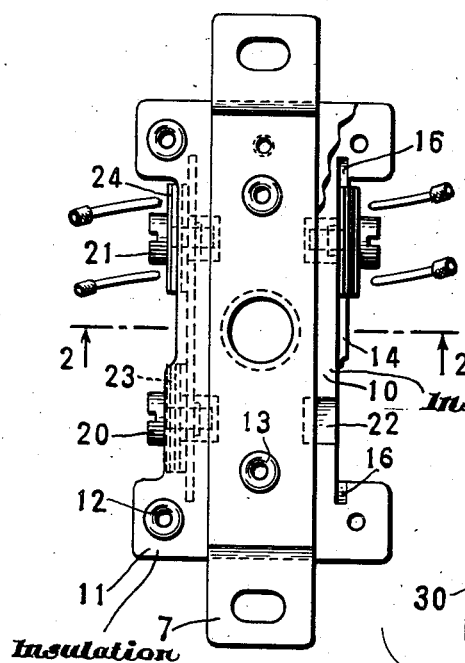
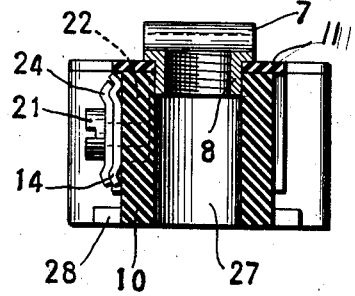
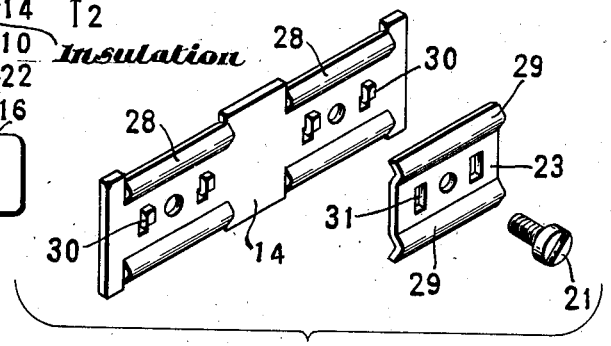
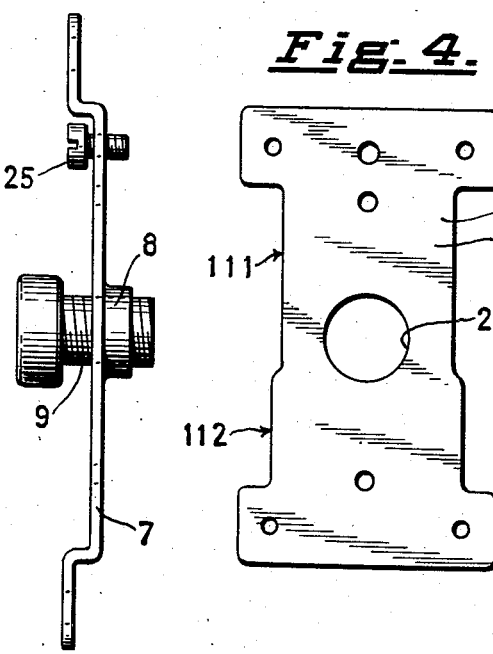
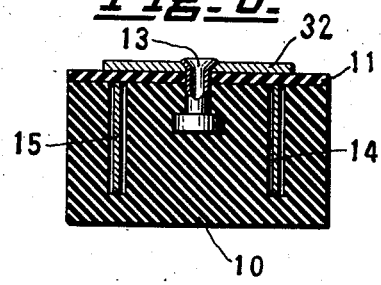
INVENTOR
FRANCIS J. HINES,
BY
ATTORNEY Patented Oct. 25, 1938

2,134,402

UNITED STATES PATENT OFFICE 2,134,402

ELECTRIC FIXTURE

Francis J. Hines, New York, N. Y., assignor to Hines Electrical Specialties, Inc., a corporation of New York Original application September 3, 1931, Serial No. 560,965. Patent No. 2,060,990, November 17, 1936. Divided and this application April 1, 1936, Serial No. 72,023

3 Claims. (Cl. 173—330)

My invention relates particularly to devices intended to be used in outlet wall boxes or receptacles for supporting electric fixtures. This application is a division from my application Serial Number 560,965 filed September 3, 1931, on which Patent 2,060,990 issued November 17, 1936.

One object is to provide means to facilitate the installation of wires in such devices.

Another object is to provide means for permitting the connection of a plurality of conductors to the same terminals without soldering or the provision of additional connecting devices.

A further object is to provide means for supporting a wall bracket in a novel and improved manner.

In carrying out the invention I provide an insulating support and a strap for mounting the support in an outlet box and in turn supporting a bracket or other device. The body of the insulating support carries two bus bars, one on each side, each bus bar being provided with a main line terminal and a branch terminal. Each of these terminals carries a clamping plate held by a single screw and each clamping plate is positioned so as to prevent its rotation.

Fig. 1 is a front view showing one form of construction embodying my invention.

Fig. 2 is a transverse sectional view on the plane of the line 2—2 of Fig. 1.

Fig. 3 is a perspective view showing the bus bar with one of the clamping plates and its screw detached.

Fig. 4 is a front view of the insulating cover plate.

Fig. 5 is an edge view of the supporting strap together with a fixture tube.

Fig. 6 is a transverse sectional view of another modification.

The supporting strap 7 is provided with an interiorly threaded portion 8 for the connection of a fixture arm or bracket, conduit, nipple, or other device 9. This strap may have slotted ears by means of which it may be secured in an ordinary outlet box (not shown).

The insulating body of the fixture is preferably formed of two parts, the main part 10 formed, for instance, of molded insulation and a top or cover part 11 which may be formed of sheet insulation or fibre. The two body parts are adapted to be secured together in any suitable manner, for instance, by one or more rivets 12. Rivets 13 secure the strap to the insulating portions.

In the sides of the body are mounted bus bars 14, 15 having ends positioned in the same plane and held in the slots 16 in the body portion beneath the insulating cover. The edges of the cover preferably protect the front edges of the bus bars and hold them in place. The binding or clamping screws 20, 21 are intended to be screwed into the opposite ends of the bus bars and into a recess or pocket 22 at each side of the insulating body. Clamp plates 23, 24 may be provided for each bus bar to enlarge the gripping area and facilitate attachment of a number of wires.

The cover part or plate 11 is cut back at 111 to permit more convenient access to a clamping plate for the attachment of a fixture wire, while another clamping plate is protected and positioned by the flange 112 of the cover plate so that the ends of the line wires which come in from the rear will be covered and guarded. An additional screw 25 may be provided if desired for grounding the strap as is customary in devices of this kind.

The insulating cover has an aperture 26 and the insulating body has a central recess 27 which permits adjustment of the nipple or fixture tube 9 into or through the body so as not to limit the length of the nipple which can be used.

The insulating body may be provided with projecting flanges 28 to guard the ends of the wires which are clamped to the bus bars.

Each bus bar has ribs 28 which serve to coact with grooved portions 29 of the clamp plates so as to assist in positioning the clamp plates and in preventing them from rotating. Additional means of securing the wires may be provided as shown in Fig. 3 where studs 30 are struck outwardly from the bus bar and adapted to project through perforations such as 31 in the clamp plate. Each stud interlocks with a perforation and prevents the clamp plate from rotating, and it also provides a convenient means for winding or hooking an end of the conductor which is to be clamped between the clamp plate and the adjacent end of the bus bar.

In the form shown in Fig. 6, the strap 32 is made wide enough to extend over the ends of the bus bars 14, 15, although it is insulated from the bus bars by the cover plate 11. The strap thus reinforces the insulating layer to hold the bus bars in place.

After the block has been mounted in the outlet box and wired into the system the fixture bracket, lamp or other device is adapted to be conveniently wired to the opposite ends of the bus bars by leading the wires of the bracket or other fixture device into the recess from the front and beneath the clamp plates.

By this arrangement, it will be seen that the work of installation and attachment or disconnection of fixtures is facilitated. This construction also makes it possible to extend wires from the main terminal plates to the fixtures by simply loosening the screws 20 and attaching additional wires beneath the clamping plates 23. Similarly additional branch circuits can be tapped off by inserting additional wires beneath the clamping plates 24.

The cover plate 11 is preferably made wide enough to cover the edges of the bus bar ends and may also cover the edges of the clamp plates and any other parts which it is desired to protect.

I claim:

1. An electric wall fixture support comprising an insulating body, bus bars secured to said body on opposite sides thereof, wire connecting means in each end of each bus bar, one such means in each bus bar being exposed at the side and accessible for connection of a circuit wire from the rear, at least the front edge of said bus bars adjacent said rear wire connecting means being shielded with insulating material in front of it, and extending laterally over at least substantial portions of circuit wires from the rear, the wire connecting means at the other end of each bus bar being similarly exposed at the side, said insulating material being narrower over the second mentioned wire connecting means than over the first whereby the second mentioned wire connecting means are more accessible from the front for view and for connection of a fixture wire from the front than are the first mentioned wire connecting means, and a supporting strap secured to the front of the body between the bus bars, exposed for supporting a fixture, and insulated from the bus bars.

2. A substantially flush wall type electric fixture support comprising an insulating body, bus bars secured to said body on the opposite sides thereof, wire connecting means in each end of each bus bar, a cover plate of insulating material in front of and holding the bus bars within the insulating body of the plug, at least one wire connecting means in each bus bar being exposed at the side and accessible for connection of a circuit wire from the rear, at least the front edge of said bus bars adjacent said rear wire connecting means being shielded by said cover plate extending laterally over at least substantial portions of circuit wires from the rear, the wire connecting means at the other end of each bus bar being similarly exposed at the side, said cover plate being narrower over the second mentioned wire connecting means than over the first whereby the second mentioned wire connecting means are more accessible from the front for view and for connection of a fixture wire from the front than are the first mentioned wire connecting means, and a supporting strap secured to the front of the body between the bus bars, exposed for supporting a fixture, and insulated from the bus bars.

3. A substantially flush wall type electric fixture support comprising an insulating body, bus bars secured to said body on opposite sides thereof, wire connecting means in each end of each bus bar, at least one such means in each bus bar being exposed at the side and accessible for connection of a circuit wire from the rear, means extending longitudinally of the body and laterally over the edges of the bus bars for holding them in place, a fixture supporting strap extending longitudinally across the front of the insulating body and secured thereto, and means carried by said strap for attachment of a fixture thereto, said strap having integral perforate extension portions adapted to be secured to an outlet box, whereby the fixture may be grounded to said strap at the front of said insulating body.

FRANCIS J. HINES.